(12) United States Patent
Braun et al.

(10) Patent No.: US 12,140,101 B2
(45) Date of Patent: Nov. 12, 2024

(54) ENGINE CALIBRATION SYSTEMS AND METHODS

(71) Applicant: Briggs & Stratton, LLC, Wauwatosa, WI (US)

(72) Inventors: Michael Paul Braun, Fox Point, WI (US); Brian Todd Brunelli, Franklin, WI (US); Darren E. Cavness, Ixonia, WI (US); Mario Divis, New Berlin, WI (US); Brett William Jury, Wauwatosa, WI (US); Mark Noller, Wauwatosa, WI (US); John A. Piechowski, Jackson, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/097,895

(22) Filed: Jan. 17, 2023

(65) Prior Publication Data

US 2023/0228228 A1    Jul. 20, 2023

Related U.S. Application Data

(60) Provisional application No. 63/300,406, filed on Jan. 18, 2022.

(51) Int. Cl.
*F02D 41/24* (2006.01)
*F02D 41/22* (2006.01)

(52) U.S. Cl.
CPC ......... *F02D 41/2432* (2013.01); *F02D 41/22* (2013.01); *F02D 41/2451* (2013.01); *F02D 41/2487* (2013.01)

(58) Field of Classification Search
CPC .. F02D 41/2432; F02D 41/22; F02D 41/2451; F02D 41/2487; G05B 19/0426
See application file for complete search history.

(56) References Cited

U.S. PATENT DOCUMENTS

| 9,639,346 B2 | 5/2017 | Tuukkanen | |
|---|---|---|---|
| 11,175,906 B2 | 11/2021 | Jeong et al. | |
| 2015/0224997 A1* | 8/2015 | Glugla | B60W 50/06 701/33.1 |

(Continued)

FOREIGN PATENT DOCUMENTS

WO  WO-2018114329 A1 *  6/2018  ......... F02D 41/2432

OTHER PUBLICATIONS

International Search Report and Written Opinion regarding PCT Application No. PCT/US2023/010939, mail date May 12, 2023, 14 pps.

*Primary Examiner* — Joseph J Dallo
(74) *Attorney, Agent, or Firm* — Foley & Lardner LLP

(57) ABSTRACT

A method for recalibrating an engine includes querying an engine for a unique engine identifier, sending the unique engine identifier to a cloud-based server, determining one or more engine calibration settings available to the engine based on the unique engine identifier sent to the cloud-based server, presenting the one or more engine calibration settings to a user through a user interface so that the user may select a desired engine calibration setting, sending the desired engine calibration setting as selected by the user to an electronic control unit of the engine, and replacing a current engine calibration with the desired engine calibration setting in the electronic control unit of the engine.

20 Claims, 11 Drawing Sheets

(56) References Cited

U.S. PATENT DOCUMENTS

| | | |
|---|---|---|
| 2019/0294135 A1 | 9/2019 | Madrid et al. |
| 2020/0005538 A1* | 1/2020 | Neeter ................ H04L 65/4015 |
| 2020/0283009 A1 | 9/2020 | Stahlin et al. |
| 2021/0191661 A1 | 6/2021 | Harata et al. |
| 2022/0034753 A1* | 2/2022 | Liebman ............. F02D 13/0203 |

* cited by examiner

Example Calibrations

| | 33HP | 37HP | 40HP |
|---|---|---|---|
| Tested and Certified Calibrations | 8 Calibrations | 15 Calibrations | 22 Calibrations |
| Equipment Manufacturer Built Calibrations | 2 Calibrations | 3 Calibrations | 6 Calibrations |
| OEM Programmable Calibrations | 8 Calibrations | 15 Calibrations | 22 Calibrations |

CALIBRATION  MFG CALIBRATION

CALIBRATION
  M61
    80092280C 1750 - 3600, CLOSED LOOP
    80092281B 1600 - 2400, CLOSED LOOP
    80092282B 2000 - 3400, CLOSED LOOP
    80092283B 1200 - 3800, CLOSED LOOP

STATUS: ECM IS CONNECTED!
CALIBRATION DATABASE: 6047Y_092621
ENGINE MODEL: M61

SELECTED CALIBRATION
CALIBRATION DESCRIPTION: 1750 - 3600, CLOSED LOOP
ENG SERIAL
CAL ID: 20295
CAL PN: 80092280C
HARDWARE PN: ###########
FIRMWARE ID: ####    HARDWARE ID: 80090918-
APP VERSION: ####    FIRMWARE ID: BSUB1310
                     APP VERSION: 4.0.0

CONFIRM                            ✕
(i) ARE YOU SURE WANT TO FLASH THE FOLLOWING ?

YES        NO

FLASH SELECTED CALIBRATION

ENGINE CALIBRATION SYSTEMS AND METHODS

CROSS-REFERENCE TO RELATED PATENT APPLICATIONS

This application claims the benefit of and priority to U.S. Provisional Application No. 63/300,406, filed on Jan. 18, 2022, the entire disclosure of which is hereby incorporated by reference herein.

BACKGROUND

Typically, engines used within outdoor power equipment are programed or calibrated to operate at certain power and speed settings based on the needs and desires of the customers. Usually, once an engine has been calibrated, the engine typically cannot be recalibrated by the customers. Therefore, customers must attempt to predict the engine calibrations they should purchase to meet their business needs.

SUMMARY

At least one embodiment relates to an engine calibration system. The engine calibration system includes an engine having an electronic control unit. The engine is calibrated with an initial engine calibration setting stored in the electronic control unit. The engine calibration system further includes a calibration tool configured to be electrically coupled to the electronic control unit, and one or more processing circuits, each comprising one or more processors and memory storing instructions that, when executed by the one or more processors, causes the one or more processors to perform operations including: querying the engine for a unique engine identifier, sending the unique engine identifier to a cloud-based server, determining one or more engine calibration settings available to the engine based on the unique engine identifier sent to the cloud-based server, presenting the one or more engine calibration settings to a user through a user interface so that the user selects a desired engine calibration setting, and sending the desired engine calibration setting to the electronic control unit. The electronic control unit is configured to implement the desired engine calibration setting in the engine. The desired engine calibration setting is different than the initial engine calibration setting.

Another embodiment relates to a method for recalibrating an engine. The method includes querying an engine for a unique engine identifier, sending the unique engine identifier to a cloud-based server, determining one or more engine calibration settings available to the engine based on the unique engine identifier sent to the cloud-based server, presenting the one or more engine calibration settings to a user through a user interface so that the user may select a desired engine calibration setting, sending the desired engine calibration setting as selected by the user to an electronic control unit of the engine, and replacing a current engine calibration with the desired engine calibration setting in the electronic control unit of the engine.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, in which:

FIG. 5 is a table presenting three use case examples of the process of FIG. 4;

FIG. 7D is an illustration of a command prompt on the recalibration page of FIG. 7B.

DETAILED DESCRIPTION

Figure 1:
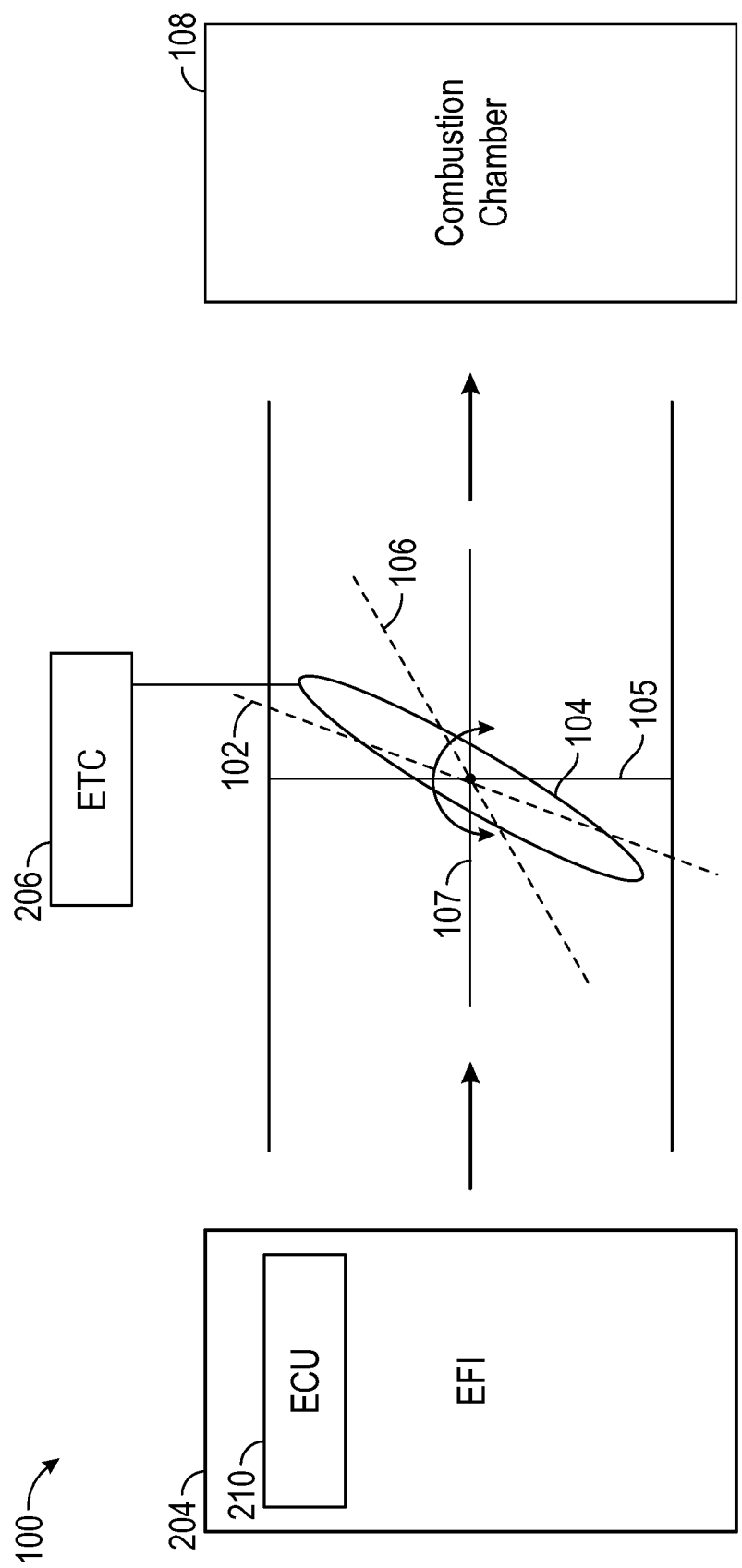
FIG. 1 is a schematic drawing of an engine throttle configured to be operated by a calibration system, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

The figures generally describe systems and methods for calibrating and recalibrating engines to better meet the business needs of original equipment manufacturers (OEMs). Different engine calibration settings may be needed based on the region the engine is used. For example, engines used in the United States of America may require different calibrations than engines used in Europe. Different engine calibrations may also be needed for different end uses. For example, an OEM that produces a variety of outdoor power equipment may need different engine calibrations for each of the pieces of equipment they make. Different calibrations may also be need for to accommodate future improvements or increased performance. Typically, OEMs will purchase engines from engine manufacturers and the engines are incorporated into equipment at an OEM site (e.g., an equipment production factory). In current systems, engine manufacturers may calibrate each engine with particular calibration settings based on what is ordered by the OEM. Additionally, once the engine manufacturer has calibrated the engine, the engine cannot be recalibrated by the OEM. Therefore, the OEM is typically required to predict or forecast the equipment inventory the OEM thinks they may sell in the future and order engines with the appropriate calibrations based on the predicted inventory. Unfortunately, OEMs are not always able to accurately predict the amount of inventory they will be able to sell and subsequently the amount of engines they should order from the engine manufacturers.

The systems and methods described herein provide solutions to this problem through a calibration system that is configured to recalibrate an engine based on the immediate needs of the OEM. More specifically, the calibration system includes a calibration tool at the OEM site that, when connected to the engine, allows the OEM to select a desired engine calibration setting and update the calibration of every engine as they see fit. The ability for the OEM to directly update the calibration of the engine gives the OEM the flexibility to be able to adjust their equipment manufacturing processes with unforeseen market fluctuations.

The systems and methods described herein provide improvements over the current systems by preventing OEMs from ordering too many or too few of a particular type of engine. This has many benefits including: 1) decreasing costs throughout the manufacturing process, 2) decreasing waste leading to a more sustainable equipment manufacturing process, 3), decreased costs associated with shipping unused engines, 4) increased efficiency in the equipment manufacturing process, and 5) increased flexibility to meet unforeseen market fluctuations.

Engines often include an electronic control unit (ECU) that is configured to operate the engine, and in some embodiments, other related components in view of various engine calibration settings. More specifically, the ECU may control components of the engine based on the engine calibration settings. For example, an ECU may control an electronic fuel injection system or an electronic throttle control system. The engine calibration settings can include, but are not limited to, a high engine speed, a low engine speed, a power rating, and a control scheme.

Engines may be categorized by the power rating associated with each engine. For example, an engine may have a power rating of 33 horsepower, 37 horsepower, or 40 horsepower. In some embodiments, the engine's power rating may be adjusted by changing one or more calibration settings. For example, in some engines, the power rating may be changed by adjusting the wide open throttle position to allow the throttle valve to open more widely.

In some embodiments, a calibration setting may include a low engine speed and a high engine speed. More specifically, an engine may be calibrated to set more specific upper and lower limits for the speed of the engine. For example, a 33 horsepower engine calibrated to adhere to a first calibration setting for a low engine speed of 1800 rpm and a second calibration setting for a high engine speed of 3500 rpm. These high and low engine speed settings are created based the limits to a fuel system. For example, the high engine speed may be the highest speed the engine can reach before components in the engine begin moving away from their correct places. As another example, the low engine speed may be the minimum speed needed to keep the engine lubricated. Additionally, the high and low engine speeds may also be based on emissions regulations. Different engine calibration settings are appropriate for different end uses. For example, an engine calibration setting for a high engine speed may be lower for a low noise end use (e.g., an end use in Europe where noise regulations may require an engine to run at lower speeds and therefore at lower noise levels).

In some embodiments, a calibration setting may further include setting a closed loop control algorithm or an open loop control algorithm for controlling changes to the fueling of the engine. In an open loop control algorithm, there is no feedback to change the fueling of the engine. In a closed loop control algorithm, the fuel system uses, for example, an oxygen sensor to add or subtract fuel in response to the sensed oxygen level in the exhaust. In some instances, a closed loop algorithm may be more appropriate. For example, in the case where a catalytic converter is installed on the engine, a closed loop control algorithm may be more appropriate based on exhaust oxygen concentration.

Referring now to FIG. 1, an engine throttle 100 is shown according to an exemplary embodiment. The engine throttle 100 includes a butterfly valve 104 configured to control the air-fuel mixture entering the engine through the engine throttle 100. More specifically, the butterfly valve 104 is configured to move between a closed position 105 and a wide-open position 107 to control the flow of the air-fuel mixture entering a combustion chamber 108 from an electrical fuel injection system 204. The butterfly valve 104 moves between the closed position 105 and the wide-open position 107 based on signals received from an electronic throttle control 206, which is described in more detail below. The position of the butterfly valve 104 is determined based on the horsepower rating of the engine and the engine calibration setting. The engine calibration setting may set a high engine speed setting 106 and a low engine speed setting 102 for the butterfly valve 104.

Figure 2:
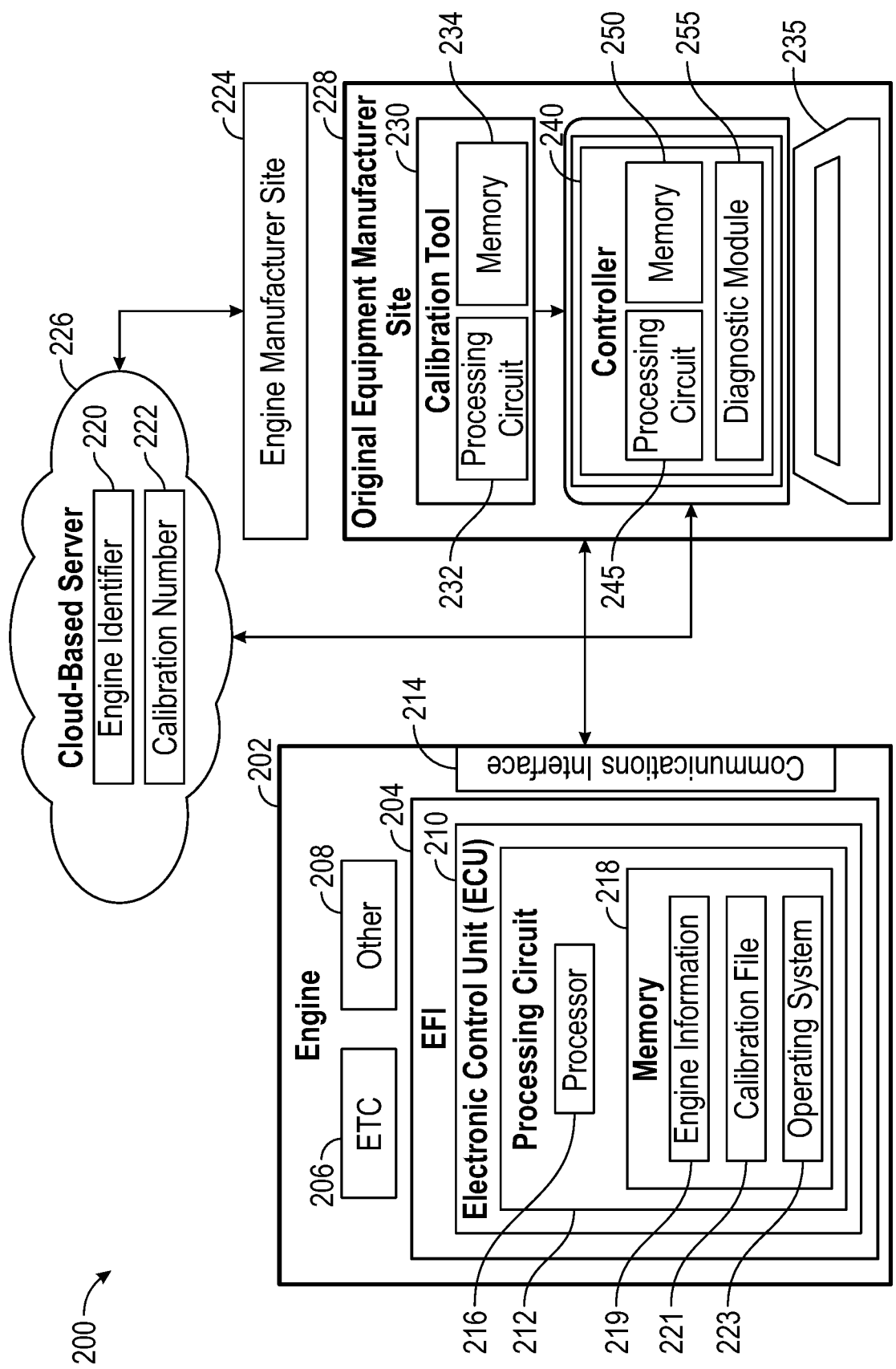
FIG. 2 is a schematic drawing of a calibration system, according to an exemplary embodiment.

Referring now to FIG. 2, a calibration system 200 is shown, according to some embodiments. The calibration system 200 may include an engine 202 that may be configured to be recalibrated to meet different manufacturing needs. The engine 202 may include the electronic fuel injection (EFI) system 204, the electronic throttle control (ETC) system 206, and other electronic controls 208. The EFI system 204 includes an electronic control unit (ECU) 210. In other embodiments, the ECU 210 is a component of a different vehicle system (e.g., the engine 202, the ETC system 206, other electronic controls 208, etc.) or as a standalone vehicle system.

The EFI system 204 is configured to supply an air-fuel mixture to one or more combustion chambers of the engine 202. The EFI system 204 receives information and signals from the ECU 210. When the EFI system 204 receives the appropriate signals from the ECU 210, one or more fuel injectors (not shown) may provide fuel to the combustion chambers.

The ETC system 206 may be configured to maintain a desired engine speed in response to varying loads applied to the engine 202. More specifically, the ETC system 206 may be electrically coupled to the butterfly valve 104 and may open and close the butterfly valve 104 based on the load applied to the engine 202 within the limitations of the engine calibration settings of the engine 202. As described above with respect to FIG. 1, the butterfly valve 104 controls the flow of an air/fuel mixture into the combustion chamber of the engine 202 and in doing so controls the speed of the engine 202. The butterfly valve 104 is movable between a closed position and a wide-open position. The closed position and the wide open position for the butterfly valve 104 may be determined based on the engine calibration settings. Though not described in detail herein, the engine 202 may include other electrical systems 208. The other electronic systems 208 may include but are not limited to an electronic ignition system and an electronic governor system.

The ECU 210 is configured to monitor and control some or all of the electrical systems (e.g., the EFI system 204, the ETC system 206, and the other electrical systems 208) within the engine 202. More specifically, the ECU 210 may control the recalibration of the engine 202 with respect to certain operational set points and other operation inputs (e.g., the calibration settings). The ECU 210 may include a processing circuit 212 that is communicably coupled to communications interface 214 such that processing circuit 212 and the various components thereof can send and receive data via communications interface 214. Processor 216 can be implemented as a general purpose processor, an application specific integrated circuit (ASIC), one or more field programmable gate arrays (FPGAs), a group of processing components, or other suitable electronic processing components.

The memory 218 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 218 can be or include volatile memory or non-volatile memory. Memory 218 can include database components, object code components, script components, or any other type of information structure for supporting the various activities and information structures described in the present application. According to an example embodiment, memory 218 is communicably connected to processor 216 via processing circuit 212 and includes computer code for executing (e.g., by the processing circuit 212 and/or the processor 216) one or more processes described herein As illustrated, the ECU 210 is implemented within a single computer (e.g., one housing, etc.). In various other embodiments the ECU 210 can be distributed across multiple servers or computers (e.g., that can exist in distributed locations).

In some embodiments, the communications interface 214 facilitates communications between ECU 210 and a calibration tool 230. Communications interface 214 can be or include wired or wireless communications interfaces (e.g., jacks, antennas, transmitters, receivers, transceivers, wire terminals, etc.) for conducting data communications between the ECU 210 and the calibration tool 230. In various embodiments, communications via communications interface 214 can be direct (e.g., local wired or wireless communications) or via a communications network (e.g., a WAN, the Internet, a cellular network, a CAN, etc.). Memory 218 includes an engine information storage 219 and a calibration file 221. The engine information storage 219 may be configured to store information related to the engine. The calibration file 221 stores the current calibration settings of the engine 202. In some embodiments, the calibration file 221 may be encrypted to prevent unauthorized persons from modifying or updating the calibration file 221 and recalibrating the engine 202. In some embodiments, the calibration tool 230 may recalibrate the engine 202 by modifying or editing the current calibration file 221 stored in the memory 218. In other embodiments, the calibration tool 230 may recalibrate the engine 202 by deleting the calibration file 221 currently stored in the memory 218 and uploading a new calibration file to the memory 218. In some embodiments, the memory 218 includes an operating system 223 configured to manage the firmware and software of the ECU 210.

The calibration system 200 may also include an engine manufacturer site 224. The engine manufacturer site 224 may be a place where the engine 202 is originally be produced. For example, the engine manufacturer site 224 may be an engine manufacturing plant or an engine manufacturing factory. In some embodiments, the engine manufacturer site 224 may be communicably coupled to a cloud-based server 226. The engine manufacturer site 224 may communicate and store original engine information about the engine 202 to the cloud-based server 226. The original information may refer to the engine information as initially determined before the engine 202 is recalibrated. The original engine information may include, but is not limited to, engine identification numbers (e.g., serial numbers, model numbers, etc.), original engine calibration information (e.g., original calibration ID, original calibration part number, original hardware identification numbers, original application versions, etc.), engine fault codes, and engine status.

The calibration system 200 may also include the original equipment manufacturer (OEM) site 228 where an OEM produces equipment for an end user. In some applications and products, the OEM may develop equipment that requires an engine to function. For example, the equipment manufacturer may develop outdoor power equipment (e.g., lawn mowers, leaf blowers, pressure washers, string trimmers, edgers, thatchers, sprayers, seeders, and the like) that require an engine such as the engine 202. In some embodiments, the OEM site 228 may obtain the engines required for the equipment produced at OEM site 228 from the engine manufacturer site 224. Typically, the engines received from an engine manufacturer site 224 may come already calibrated based the calibrations needed by the OEM. Once the engines have already been calibrated, they typically could not be recalibrated by an OEM at an OEM site. Therefore, the OEM at the OEM site would have to forecast the types of engines needed to meet the OEM's business demands in the future and order those specific types of engines from the engine manufacturer.

Forecasting business needs and ordering an inventory of engines to meet those business needs does not exactly approximate the amount of inventory needed leading to ordering either too much or too little of the inventory needed. For example, a lawn mower OEM may produce different types of lawn mowers that require different engines that have different calibrations. The lawn mower OEM may forecast that they will produce one hundred riding lawn mowers and one hundred push mowers during the first quarter of their upcoming year. In this case, the OEM may predict that they need one hundred, 33 horsepower engines with calibration A to manufacture one hundred riding lawn mowers and one hundred, 33 horsepower engines with calibration B to manufacture hundred push lawn mowers to meet their business needs. At the mid quarter business meeting, the lawn mower OEM realizes that they have already sold ninety riding lawn mowers and only thirty push mowers. Unfortunately, the OEM did not anticipate the growing popularity of their riding lawn mowers and did not order enough engines to make their riding lawn mowers. The lawn mower OEM may then lose sales and revenue throughout the rest of first quarter given their incorrect prediction of the engines needed to create riding lawn mowers. Therefore, systems and methods for recalibrating engines may allow OEMs to have flexibility when ordering engines leading to decreased manufacturing costs for the OEMs.

The engines purchased by the OEM may be recalibrated at the OEM site 228 with the calibration tool 230. In some embodiments, the calibration tool 230 may include a processing circuit 232 and a memory 234. The processing circuit 232 may include an ASIC, one or more FPGAs, a DSP, circuits containing one or more processing components, circuitry for supporting a microprocessor, a group of processing components, or other suitable electronic processing components. In some embodiments, the processing circuit 232 is configured to execute computer code stored in the memory 234 to facilitate the systems and processes described herein. The memory 234 may be any volatile or non-volatile computer-readable storage medium capable of storing data or computer code relating to the systems and processes described herein. According to an exemplary embodiment, the memory 234 includes computer code modules (e.g., executable code, object code, source code, script code, machine code, etc.) configured for execution by the processing circuit 232.

The OEM site 228 may also include a user device 235 configured to facilitate the recalibration of engines at the OEM site 228. The user device 235 maybe a laptop computer, a desktop computer, a tablet, a smart phone, or other device including an input device like a keyboard or touch screen and a display screen. More specifically, the user device 235 may include a processing circuit or processing circuit 245, a memory 250, and a diagnostic module 255. The diagnostic module 255 may work with the calibration tool 230 and the cloud-based server 226 to determine the calibrations available for the engine 202 and recalibrate the engine 202 based on the available calibrations. The processing circuit 245 may include an ASIC, one or more FPGAs, a DSP, circuits containing one or more processing components, circuitry for supporting a microprocessor, a group of processing components, or other suitable electronic processing components. In some embodiments, the processing circuit 245 is configured to execute computer code stored in the memory 250 to facilitate the systems and processes described herein. The memory 250 may be any volatile or non-volatile computer-readable storage medium capable of storing data or computer code relating to the systems and processes described herein. According to an exemplary embodiment, the memory 250 includes computer code modules (e.g., executable code, object code, source code, script code, machine code, etc.) configured for execution by the processing circuit 245.

In some embodiments, the OEM creates an account with engine manufacturer site 224 in order to recalibrate the engine 202. In some embodiments, the calibration tool 230 may be communicably coupled to the cloud-based server 226. Furthermore, the calibration tool 230 may send and receive engine information to and from the cloud-based server 226 via the diagnostic module 255. The cloud-based server 226 may include an engine identifier 220 and a calibration number 222. The engine identifier 220 may be used to determine calibration options for the engine 202. The diagnostic module 255 may determine the current engine calibration settings of the engine 202 based on the calibration number 222 and facilitate recalibrating the engine 202 based on the identification of the engine 202 and the desires of the OEM. For example, only certain engine calibration settings are available to certain engines. Therefore, by receiving the identity of the engine 202 from the engine identifier 220 and/or previous calibration number 222, the diagnostic module 255 can determine the engine calibration settings available for the engine 202. The OEM may then pick a calibration setting from the engine calibration settings available for engine 202 to recalibrate the engine 202 through the diagnostic module 255 on the user device 235. In some embodiments, such as when replacing the EFI system 204 and/or the ECU 210, the diagnostic module 255 may determine the previous calibration settings of the engine 202 and recalibrate the engine 202 to have the same calibration settings it had previously. In some embodiments, the available engine calibration settings may be based on certified emission characteristics so that when a user selects an available calibration setting to recalibrate the engine, the engine will still be operating in accordance with the certified emission characteristics.

As mentioned above, the OEM site 228 may send original engine information to the cloud-based server 226, which may then be received and used to calibrate the engine 202 using the calibration tool 230. Once the calibration tool 230 has calibrated the engine 202, the calibration tool 230 may send updated engine information to the cloud-based server 226. The updated engine information may include, but is not limited to, updated engine calibration information (e.g., updated calibration ID, updated calibration part number, updated hardware identification numbers, updated application versions, etc.), updated engine fault codes, updated engine status, a history detailing the changes (e.g., recalibrations) made to the engine 202, the date of the recalibration, the time of the recalibration, the location of the recalibration, and other information related to the particulars of the changes made to the engine 202 at the OEM site 228. In some embodiments, the calibration tool 230 may determine the current calibration of the engine 202 based on the original engine information or the updated engine information as stored on the cloud-based server 226. Once the calibration tool 230 has determined the current calibration of the engine 202, the calibration tool 230 may recalibrate the engine 202 as desired by the OEM at the OEM site 228. In some embodiments, the calibration tool 230 may recalibrate the engine 202 by updating portions of the ECU 210 associated with the engine 202. For example, the calibration tool 230 may update firmware or software used to control the engine speed within the ECU 210.

In some embodiments, the calibration tool 230 may be communicably coupled to the diagnostic module 255 to facilitate the recalibrating of the engine 202 as described herein. The user device 235 may display one or more user interfaces that communicate engine information to a user and allow the user to select a recalibration setting. For example, the user interface 700 as described in FIGS. 7A-7E may be displayed on user device 235. The user device 235 may include one or more user input interfaces (e.g., touch screen surface, mouse, microphone, keyboard, etc.) that may be used to receive input from the user and facilitate interaction between the user interface and the user.

Figure 3:
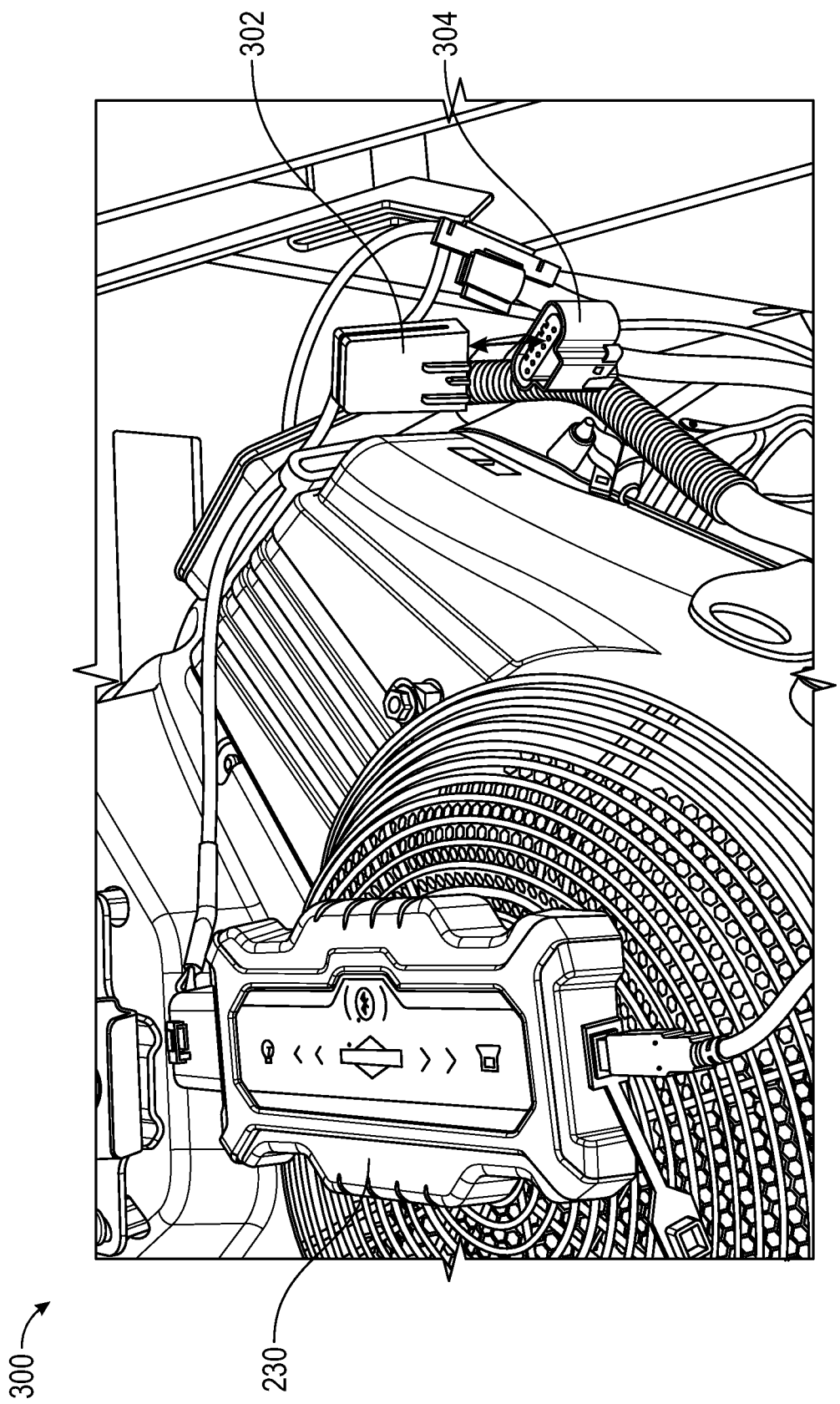
FIG. 3 is a perspective view of components of the calibration system of FIG. 2.

Referring now to FIG. 3, a physical implementation 300 of the calibration system 200 is shown according to an exemplary embodiment. The physical implementation 300 shows some of the components of the calibration system 200 described above. For example, the calibration tool 230 is shown in the physical implementation 300. The calibration tool 230 is shown to be communicably coupled to an engine through calibration tool connector 302 and engine connector 304. In some embodiments, the engine connector 304 may be the same component as the communications interface 214.

Figure 4:
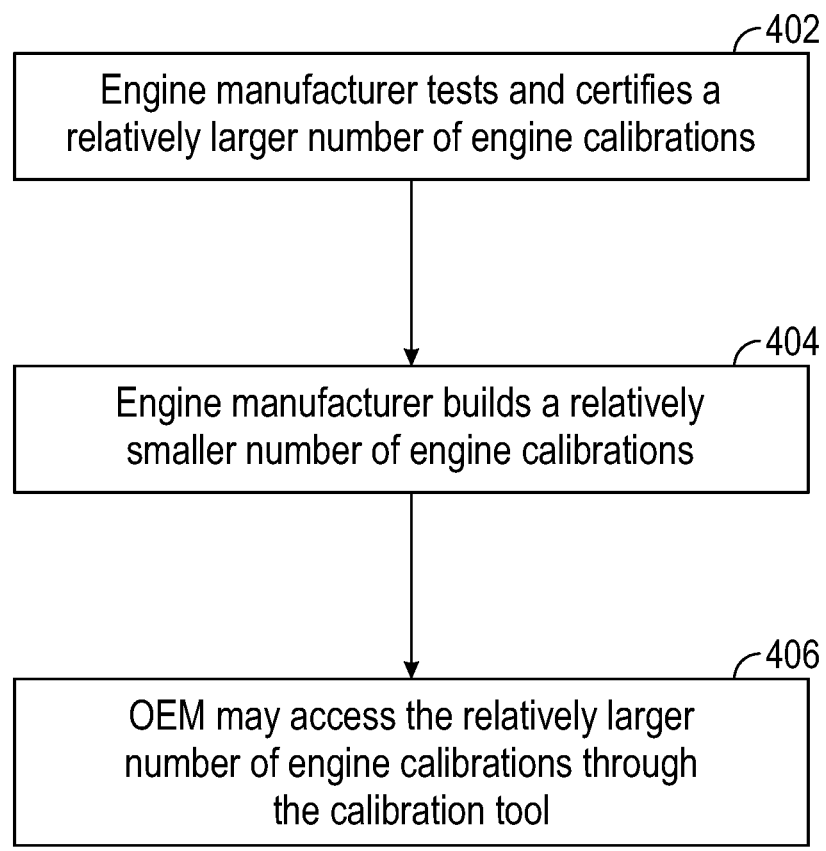
FIG. 4 is flow chart illustrating a process for deploying multiple calibrations for an engine using the calibration system of FIG. 2.

Referring now to FIG. 4, a process 400 for developing multiple calibrations for an engine is shown according to an exemplary embodiment. As mentioned above, engine manufacturers may create multiple engines, each with multiple calibrations so that an equipment manufacturer may have the flexibility to reprogram the engines as desired. The process 400 begins at step 402 with the engine manufacturer testing and certifying a relatively large number of engine calibrations. Testing and certifying refers includes developing calibrations that adhere to particular rules, standards, and regulations where the engine may be used. For example, in certain jurisdictions, engines must meet certain emissions standards or adhere to noise regulations. The engine manufacturer would then test each engine with its respective calibrations to ensure that the engine satisfies every relevant rule, standard, and regulation. The engine manufacturer may then certify that the engines meet the relevant rules, standards, and regulations by sending the testing results to one or more regulatory entities who may confirm the testing results and certify the engines.

The number of engine calibrations is relatively large compared to the number of engines actually created by the engine manufacturer. For example, as shown in FIG. 5, an engine manufacturer may create three types of engines with different power ratings (e.g., a 33 horsepower engine, a 37 horsepower engine, and a 40 horsepower engine). At step 402, a relatively large number of engine calibrations would be tested and certified for each of the three engines by the engine manufacturer. For example, the engine manufacturer may test and certify eight calibrations for a 33 horsepower engine, which is a larger number than the two calibrations that are built by the engine manufacturer (e.g., at the engine manufacturer site 224). In some embodiments, each engine type is capable of operating under multiple engine calibrations that have passed the applicable emissions regulations promulgated by the Environmental Protection Agency and/or other regulations from other regulatory bodies. When an engine of a particular type leaves the engine manufacturing site, the initial engine calibration has been certified as meeting the appropriate emissions regulation. When the OEM recalibrates that engine with a new engine calibration from the list of possible engine calibrations, that new calibration has also been certified as meeting the appropriate emissions regulation. In this way, the engine manufacturer is able to have each available engine calibration for a particular type or model of engine be certified as meeting the applicable regulations, while giving the OEM the freedom to choose from the full list of available certified engine calibrations when manufacturing equipment using that type of engine.

At step 404, the engine manufacturer builds a relatively smaller number of engine calibrations than the number of calibrations tested and certified at step 402. For example, as shown in FIG. 5, the engine manufacturer may test and certify 15 calibrations for a 37 horsepower engine, but the engine manufacturer may only build 3 of the 15 calibrations for the 37 horsepower engine for purchase by an OEM, with the OEM then able to recalibrate a purchased engine to any of the 15 calibrations.

At step 406, the OEM at OEM site 228 may access the relatively large number of engine calibrations through the calibration tool 230. As described above, the calibration tool 230 may be connected to the engine 202 and recalibrate the engine 202 based on the calibrations available for the engine 202 and the desires of the OEM. For example, a 40 horse power engine as shown in FIG. 5, have 22 calibrations available for the OEM to choose from. The OEM may recalibrate the 40 horsepower engine with any of 22 calibrations available.

Figure 6:
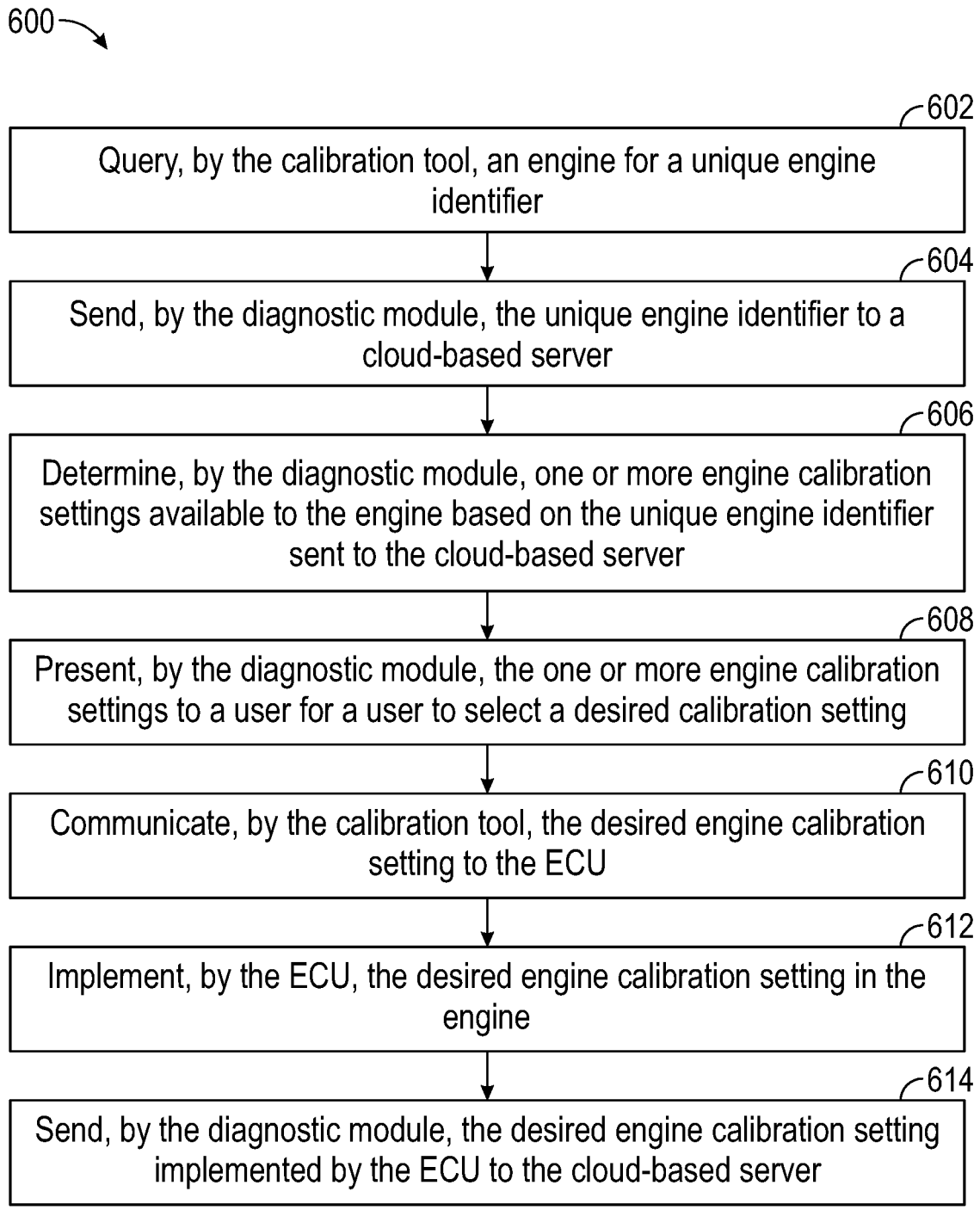
FIG. 6 is a flow chart illustrating a process for recalibrating an engine.

Referring now to FIG. 6, a process 600 for recalibrating the engine 202 is shown, according to an exemplary embodiments. In some embodiments, the process 600 may be implemented by an OEM at the OEM site 228. As mentioned above, the OEM may desire to recalibrate the engine 202 as needed to meet their business needs. The process 600 may be used as many times as the OEM desires to recalibrate the engine. Though the steps of the process 600 are illustrated as being implemented at the OEM site 228 by the calibration tool 230 and the diagnostic module 255, these embodiments are meant to be only exemplary and not limiting. The steps of the process 600 may be implemented by one or more other components of the calibration system 200. For example, in some embodiments, one or more steps of the process 600 may be implemented by cloud-based server 226.

The process 600 starts at step 602 with the calibration tool 230 querying the engine for a unique engine identifier. More specifically, the calibration tool 230 may send a request for engine information to the ECU 210. The ECU 210 may then provide one or more unique engine identifiers to the calibration tool 230 in response to the request for engine information. For example, the engine 202 may provide an engine serial number, engine model number, the initial engine calibration, engine part number, or other identifier unique to the engine or the current engine calibration to the calibration tool 230 in response to query. In some embodiments, in response to the request sent by the calibration tool 230, the unique engine identifier may be entered manually into the user device 235 to be used by diagnostic module 255.

At step 604, the diagnostic module 255 sends the engine identifier to the cloud-based server 226. As mentioned above, the cloud-based server 226 may store a variety of engine information including the original information as developed by the engine manufacturer and the updated engine information as determined by the OEM. In some embodiments, the cloud-based server 226 may store the engine calibration settings available to recalibrate the engine 202. In other embodiments, the user device 235 may store the engine calibration settings available to recalibrate the engine locally on the memory 250. Going back to the example use case of FIG. 5, if engine 202 was a 33 horsepower engine, then 8 engine calibrations corresponding to engine 202 would be stored in the cloud-based server 226. By sending the unique engine identifier to the cloud-based server 226, the diagnostic module 255 can determine the engine calibrations settings available for engine 202.

At step 606, the diagnostic module 255 determines one or more engine calibration settings available to the engine 202 based on the unique engine identifier sent to the cloud-based server 226. More specifically, the diagnostic module 255 located on the user device 235 may determine the one or more engine calibration settings available to engine 202 by comparing the unique engine identifier to the engine information stored in the cloud-based server 226. The engine information stored in the cloud-based server 226 may include the engine calibration settings available to each engine created at the engine manufacturer site 224. In other embodiments, the diagnostic module 255 can determine the last known engine 202 calibration settings by pulling data from the cloud-based server 226. The diagnostic module 255 may then determine the calibration settings available for the engine 202 based on the last known engine 202 calibration setting. In some embodiments, the available engine calibration settings may be based on certified emission characteristics so that when a user selects an available calibration setting to recalibrate the engine, the engine 202 will still be operating in accordance with the certified emission characteristics.

At step 608, the diagnostic module 255 presents the one or more engine calibration settings to a user for the user to select a desired engine calibration setting. In some embodiments, the user may be an OEM or an employee of the OEM who desires to recalibrate the engine 202. The one or more engine calibration settings may be presented to the user through a user interface displayed on the user device 235. In some embodiments, the user device 235 may present the one or more engine calibration settings in a user interface similar to user interface 700, which is described in more detail below with respect to FIGS. 7A-7E. Once the user device 235 has presented the one or more engine calibration settings to the user, the user may select a desired engine calibration setting from the available setting. For example, if the user is creating outdoor power equipment for both the European market and the American market, the user may select to recalibrate some engines with a European-specific engine calibration setting and some engines with an American-specific engine calibration setting. Once the user has made their selection, the process 600 proceeds to step 610.

At step 610, the calibration tool 230 communicates the desired engine calibration setting to the ECU 210. As mentioned above, the calibration tool 230 and the ECU 210 are communicably coupled through the communications interface 214, which facilitates communication between the different components of the engine 202 and any outside components such as the calibration tool 230. Once the calibration tool 230 has communicated the desired engine calibration setting to the ECU 210, the process proceeds to step 612.

At step 612, the ECU 210 implements the desired engine calibration setting on the engine 202. In some embodiments, the ECU 210 may implement the desired engine calibration setting by updating the existing calibration file stored in the ECU 210 with the desired engine calibration setting. In other embodiments, the ECU 210 may implement the desired engine calibration setting by updating the current calibration file to reflect the desired engine calibration settings. For example, the ECU 210 may update the high and low engine speed settings in the current calibration file stored in the memory of the ECU 210. In some embodiments, the ECU 210 may authenticate the recalibration request from the calibration tool before implementing any changes to ensure that only authorized users and/or systems are recalibrating the engine 202. Once the desired engine calibration settings have been implemented in the engine 202 by the calibration tool 230, the diagnostic module 255 may send the updated engine calibration settings to the cloud-based server 226 at step 614. Additionally, at this step, the diagnostic module 255 may also send identifying information associated with the person or entity who updated the calibration settings for the engine 202 to the cloud-based server 226. The identifying information may include the name and/or identification number of the person or entity who updated the engine calibration settings. In other embodiments, the updated engine calibration settings may be stored locally on the user device 235 and then periodically uploaded to the cloud-based server 226 when appropriate (e.g., when a user wants free up space on the local device, when the local device is connected to an internet network, etc.).

Figure 7A:
FIG. 7A is an illustration of a dashboard on a graphical user interface of the calibration system of FIG. 2.
Figure 7B:
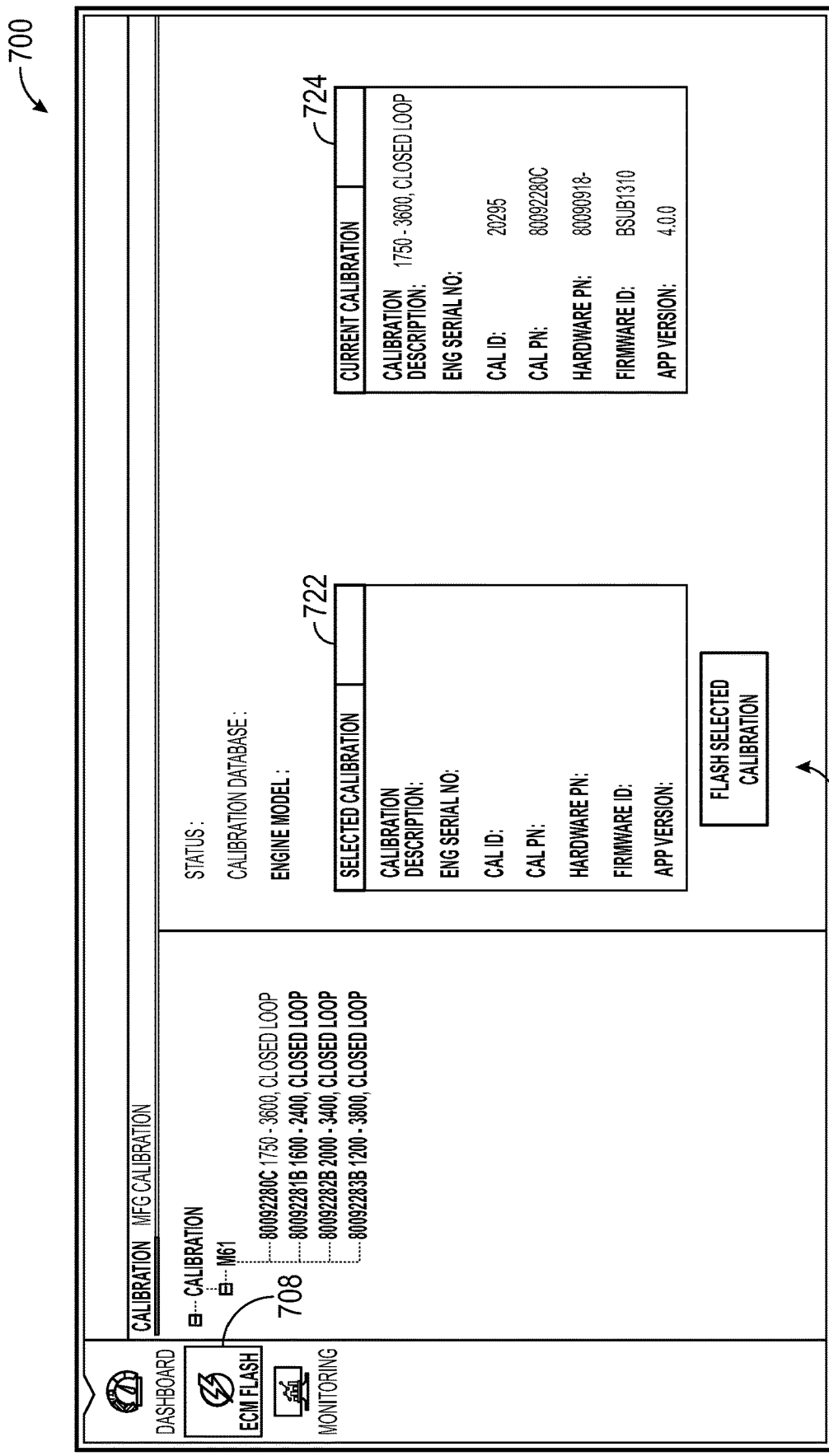
FIG. 7B is an illustration of a recalibration page on the graphical user interface of FIG. 7A.
Figure 7C:
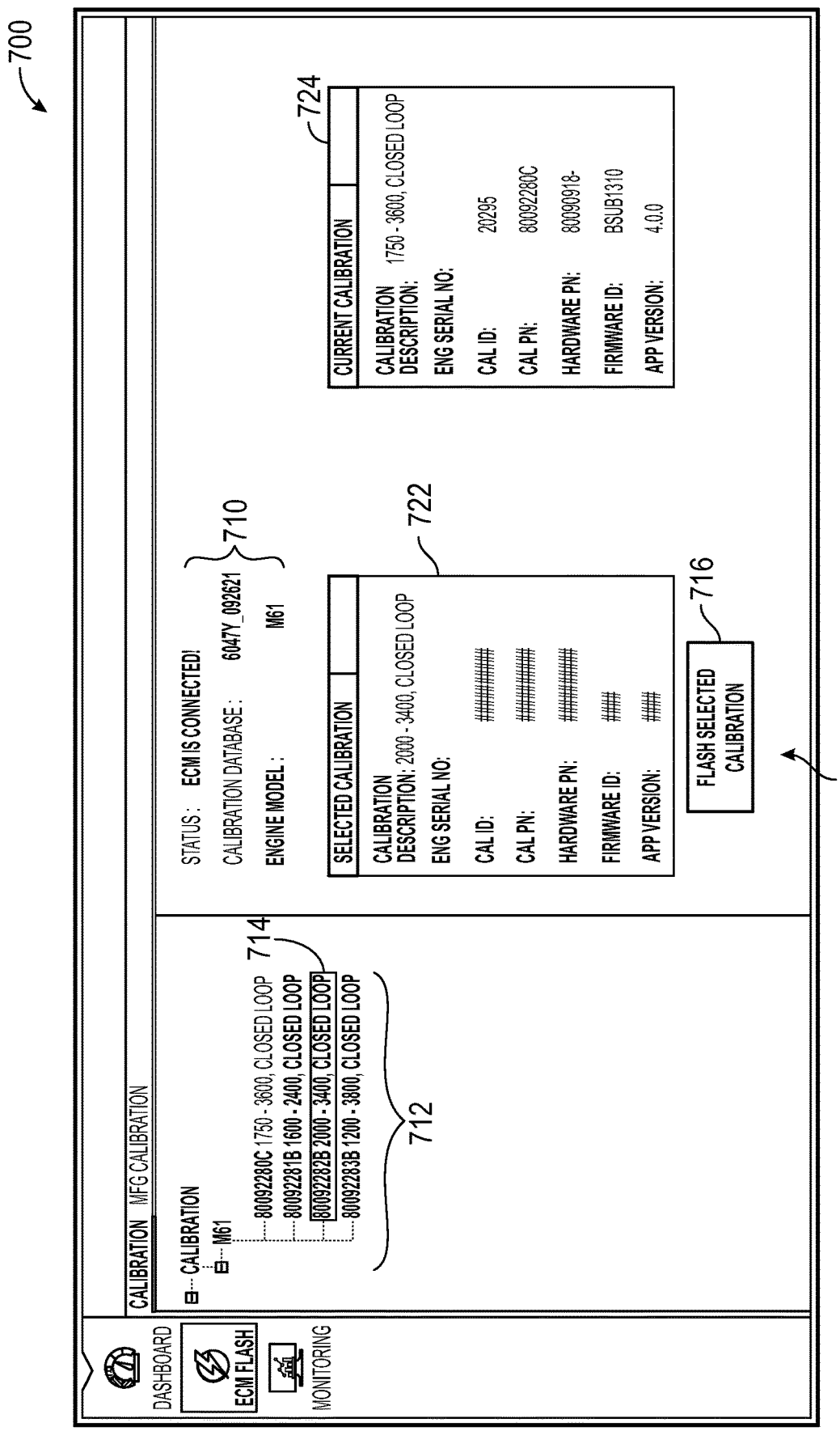
FIG. 7C is an illustration of the recalibration page of FIG. 7B with an engine calibration selected.
Figure 7E:
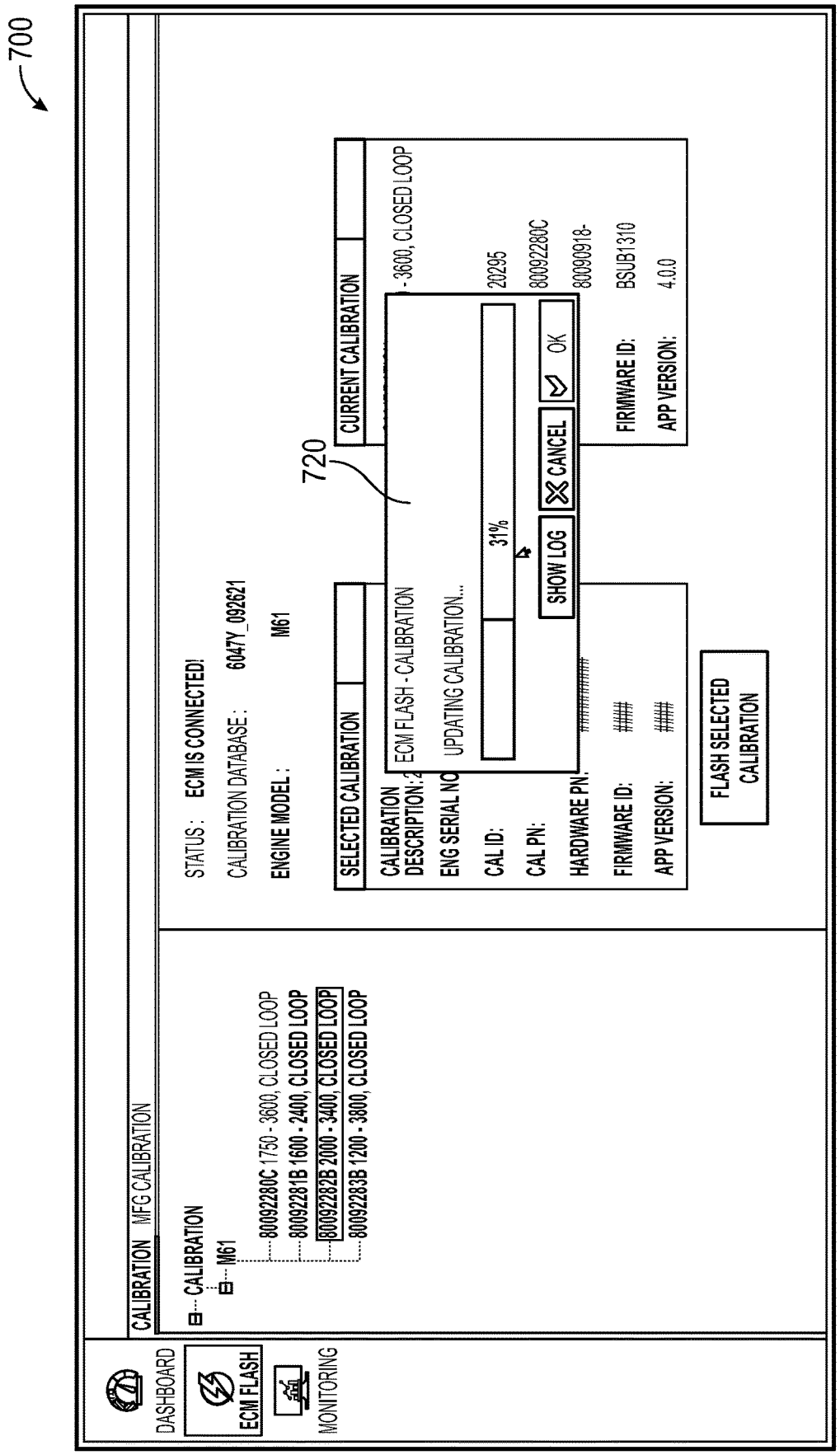
FIG. 7E is an illustration of a progress bar on the recalibration page of FIG. 7B.

Referring now to FIGS. 7A-7E, multiple views of a user interface 700 for recalibrating the engine 202 is shown, according to an exemplary embodiment. In some embodiments, the user interface 700 is displayed by the user device 235. FIG. 7A shows the example user interface 700 with a dashboard 702 being displayed. The dashboard 702 can be accessed by clicking the dashboard button 704. The dashboard 702 includes various dials and other tables that display operating characteristics of the engine 202. FIGS. 7B-7E shows an example user interface 700 with a recalibration page 706 being displayed. The recalibration page 706 can be accessed by clicking the recalibration button 708. The recalibration page 706 can be used by the user to select a desired engine calibration setting. For example, the engine information for an engine is displayed at user interface portion 710 (FIG. 7C) and the available engine calibration settings for the engine is displayed at user interface portion 712. In the example user interface 700, the user selects a desired engine calibration setting 714. Selected calibration details are displayed under the "Selected Calibration" box 722. Users can then compare the selected calibration to the current engine calibration displayed under the "Current Calibration" box 724. By clicking a flash selected calibration button 716, the OEM can recalibrate the engine 202 (i.e., updating the ECU to include the selected calibration and replacing the current calibration). In some embodiments, a confirmation box 718 is displayed to a user to confirm that they would like to recalibrate the engine 202 (see, e.g., FIG. 7D). FIG. 7E shows a progress bar 720 that displays a progress of the calibration tool 230 while recalibrating the engine 202.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the calibration system 200 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An engine calibration system comprising:
an engine including an electronic control unit, wherein the engine is calibrated with an initial engine calibration setting stored in the electronic control unit;
a calibration tool configured to be electrically coupled to the electronic control unit; and
one or more processing circuits, each comprising one or more processors and memory storing instructions that, when executed by the one or more processors, causes the one or more processors to perform operations including:
querying the engine for a unique engine identifier,
sending the unique engine identifier to a cloud-based server,
determining one or more engine calibration settings available to the engine based on the unique engine identifier sent to the cloud-based server,
presenting the one or more engine calibration settings to a user through a user interface so that the user selects a desired engine calibration setting, and
sending the desired engine calibration setting to the electronic control unit;
wherein the electronic control unit is configured to implement the desired engine calibration setting in the engine, and
wherein the desired engine calibration setting is different than the initial engine calibration setting.

2. The engine calibration system of claim 1, wherein the electronic control unit is configured to implement the desired engine calibration setting in the engine by modifying a current calibration file to reflect the desired engine calibration setting.

3. The engine calibration system of claim 1, wherein the electronic control unit is configured to implement the desired engine calibration setting in the engine by replacing a current calibration file with a new calibration file that reflects the desired engine calibration setting, wherein the current calibration file and the new calibration file each contain a plurality of engine calibration settings.

4. The engine calibration system of claim 1, wherein the electronic control unit includes a memory that stores information related to the engine that includes at least one of an engine serial number, an engine model number, an engine calibration identification number, and an engine calibration part number.

5. The engine calibration system of claim 4, wherein the unique engine identifier is one of the engine serial number, the engine model number, the engine calibration identification number, or the engine calibration part number.

6. The engine calibration system of claim 1, wherein the unique engine identifier is the initial engine calibration setting.

7. The engine calibration system of claim 1, wherein the one or more engine calibration settings are stored in the cloud-based server.

8. The engine calibration system of claim 1, wherein the one or more engine calibration settings are configured so that operation of the engine meets at least one of an emission regulation or a noise regulation.

9. The engine calibration system of claim 1, further comprising a diagnostic module that is in communication with the cloud-based server and configured to send the unique engine identifier to the cloud-based server and determine the one or more engine calibration settings available to the engine.

10. A method for recalibrating an engine comprising:
querying an engine for a unique engine identifier;
sending the unique engine identifier to a cloud-based server;
determining one or more engine calibration settings available to the engine based on the unique engine identifier sent to the cloud-based server;
presenting the one or more engine calibration settings to a user through a user interface so that the user may select a desired engine calibration setting;
sending the desired engine calibration setting as selected by the user to an electronic control unit of the engine;
sending, by a calibration tool, the desired engine calibration setting to a cloud-based server to associate the desired engine calibration setting with the engine and store the desired engine calibration setting; and
replacing a current engine calibration with the desired engine calibration setting in the electronic control unit of the engine.

11. The method of claim 10, further comprising implementing the desired engine calibration setting in the engine by modifying a current calibration file to reflect the desired engine calibration setting.

12. The method of claim 10, further comprising implementing the desired engine calibration setting in the engine by replacing a current calibration file with a new calibration file that reflects the desired engine calibration setting.

13. The method of claim 10, wherein the unique engine identifier is one of an engine serial number, an engine model number, an engine calibration number, or an engine calibration part number.

14. The method of claim 10, wherein the unique engine identifier is the current engine calibration setting.

15. The method of claim 10, wherein the one or more engine calibration settings are stored in a cloud-based server.

16. The method of claim 10, wherein the one or more engine calibration settings are configured so that operation of the engine meets at least one of an emission regulation or a noise regulation.

17. The method of claim 10, further comprising sending, by the calibration tool, a time, a date, and a location of an implementation of the desired engine calibration setting to the cloud-based server to associate the time, the date, and the location of the desired engine calibration setting with the engine and store the time, the date, and the location of the desired engine calibration setting.

18. The method of claim 10, further comprising displaying the one or more engine calibration settings available to the engine.

19. The method of claim 10, further comprising displaying the current engine calibration and the one or more engine calibration settings available to the engine.

20. The engine calibration system of claim 1, wherein the calibration tool includes the one or more processing circuits.

* * * * *